Figure 1:
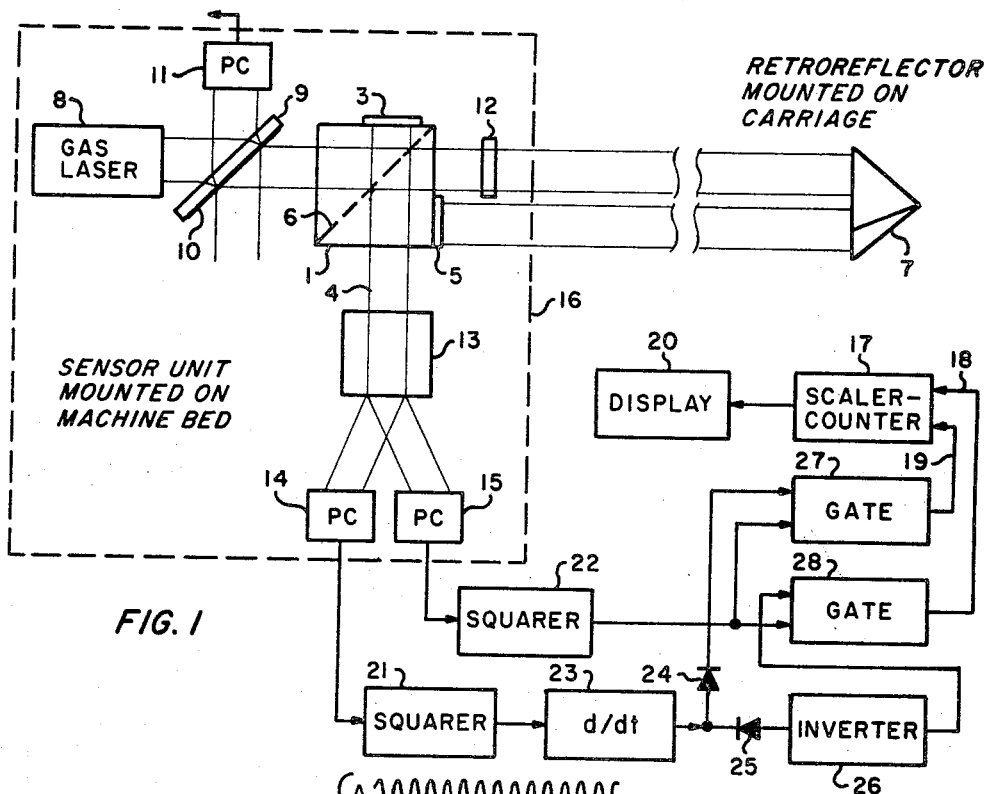

Nov. 5, 1968  C. J. HUBBARD  3,409,375

GAUGING INTERFEROMETER SYSTEMS

Filed Oct. 21, 1964

INVENTOR
CHARLES J. HUBBARD
BY
ATTORNEY

# United States Patent Office 3,409,375
Patented Nov. 5, 1968

3,409,375
GAUGING INTERFEROMETER SYSTEMS
Charles J. Hubbard, Huntington, N.Y., assignor to Cutler-Hammer, Inc., Milwaukee, Wis., a corporation of Delaware
Filed Oct. 21, 1964, Ser. No. 405,494
2 Claims. (Cl. 356—106)

This invention relates to measuring or gauging devices of the optical interferometer type with which distances are measured by counting the total number of interference fringes produced when one of the elements of the device is moved through the distance to be measured. With the advent of highly monochromatic coherent light sources, such as gas lasers, it became possible in theory to measure relatively long distances of many feet, as compared to a maximum of a few inches that could be measured with non-coherent light. In practice such long-path interferometry raises new problems that are peculiar to the light source, and aggravates old problems such as alignment, susceptibility to vibration, and beam spreading by diffraction.

One of the new problems is that of disturbances in operation of the light source by light that returns to it from reflector elements of the interferometer. The laser is essentially an oscillator with a resonator defined by two mirrors that face each other and are spaced an integral number of half wavelengths, in order to support a standing wave. One mirror is partially transmissive to allow the emission of light. If a substantial part of the emitted light returns axially to the laser, the effect is that additional resonators of random lengths are coupled to the oscillator. At least one of the additional resonators varies in length with normal operation of the interferometer, causing fluctuations in the light output that can introduce errors in the fringe count.

Gauging interferometers operate by splitting a light beam from the source into two beams which are directed over separate paths, one of which is variable in length, and then reunited. The reunited beams must be approximately equal in intensity in order to interfere effectively. In long path interferometric gauging, one path is necessarily many times as long as the other under some operating conditions.

Owing to diffraction, a collimated beam of light of wavelength $\lambda$, and of initial diameter $d$, will spread out at an angle of about $\lambda/d$. Since the intensity at any location along a beam is inversely proportional to the cross sectional area of the beam at that location, the value of $\lambda/d$ must be small enough to ensure that the reunited beams are of about the same diameter, and hence intensity, notwithstanding their difference in path length. Accordingly, the beam diameter required, and therefore the aperture, i.e. size, of the optical elements needed, is approximately proportional to the maximum length gauging capability of the interferometer. The cost of a precisely constructed optical element such as a beam splitter is in general much more than directly proportional to the size of the element in question.

Over 160,000 fringes will occur with a movement of one inch of the movable mirror in a gauging interferometer using light of wavelength $6328 \times 10^{-8}$ cm., characteristic of a helium-neon laser. The fringes appear as a sequence of variations between a maximum and a minimum intensity of light in the region where interference occurs. They are usually detected photoelectrically and counted by an electronic counter.

The counter must be reversible, not only to accommodate relatively gross motion in either direction, but also to prevent erroneous cumulative counting of variations caused by ambient mechanical vibrations of the apparatus. To control the direction of operation of the counter, the interferometer is usually designed to divide one of the light beams into two contiguous beams, one of which is made to follow a path of a total length that differs from that of the other by one quarter (or an odd multiple of one quarter) wavelength. The beams are interfered and detected separately, producing respective signals that are in quadrature relationship to each other. The phase sequence, i.e. which one leads the other, depends on the direction of motion of the interferometer mirror, and is used to control the direction of counting.

The foregoing arrangement is the equivalent of two parallel mechanically linked interferometers, one arm of one being slightly different in length from the corresponding arm of the other. Although common optical elements (reflectors, beam splitter) can be and preferably are used by both interferometers, said elements must be large enough to accommodate both beams, both of which must be large enough to allow for the diffraction effect previously discussed.

The principal object of this invention is to provide gauging interferometers particularly adapted for advantageous use with coherent light sources to measure distances many times longer than the longest that can be measured with prior art interferometers using non-coherent light.

Another object is to provide interferometers of the above type that are rugged in construction, with critical optical elements permanently aligned, and sufficiently dependable for routine shop or toolroom use.

A further object is to provide long path interferometers wherein the optical components may be made substantially smaller and less expensive than would be required by mere extension of prior art practices to larger interferometers.

A more specific object is to provide improved methods and means for directional sensing in gauging interferometers, whereby the size of the optical components may be minimized.

Another specific object is to provide methods and means for preventing undesirable reactions between a laser light source and a utilization device such as an interferometer that tends to return an appreciable amount of energy to the laser resonator.

According to this invention, the two beams required for directional sensing are made spatially coincident, whereby the optical components need be made no larger than if only a single beam were used. In one embodiment the beams are plane polarized at right angles to each other, and are distinguished from each other by polarization sensing means. In another embodiment, the effect of two (or more) beams is produced by cyclically varying the length of one of the light paths in the interferometer by a small amount and at a frequency that is substantially higher than the maximum fringe-counting rate, and detecting the relative phase of the resultant variation in light intensity.

Other features of the invention include a novel beam splitter structure especially adapted for use with "folded optics," enabling arrangement of all the interferometer components except a movable reflector in a single compact unit, and "padding" means between the laser and the remainder of the interferometer to prevent interaction. In one form, the padding means serves also to divert a portion of the laser output to a monitoring device that is required to maintain optimum adjustment of the laser.

Figure 4:
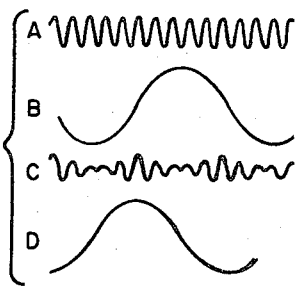
Figure 3:
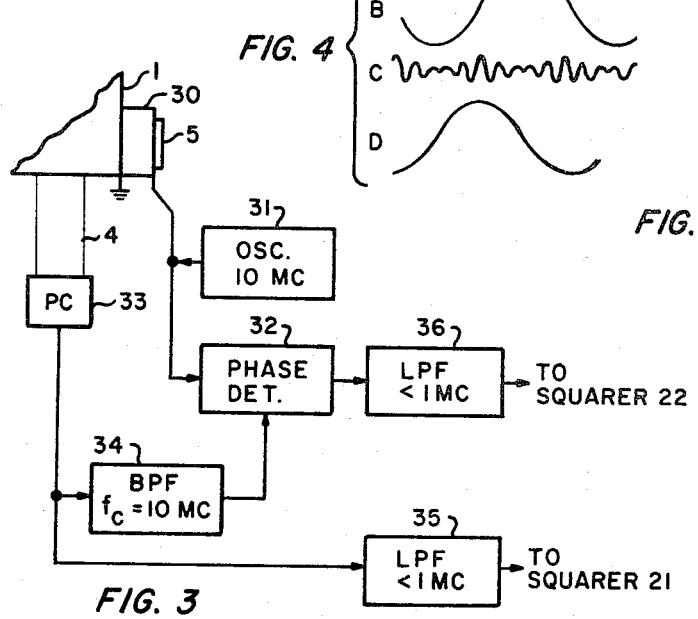
Figure 2:
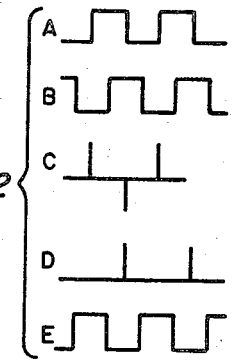

The invention will be described with reference to the accompanying drawing, wherein:

FIG. 1 is a schematic diagram of a presently preferred embodiment of the invention including an optical interferometer and associated electronic devices, FIG. 2 is a group of graphical representations of electrical signals occurring in the operation of the system of FIG. 1, FIG. 3 is a schematic diagram of a portion of an interferometric gauging system, showing a modification of the system of FIG. 1, and FIG. 4 is a group of graphical representations of signals occurring in the operation of the system of FIG. 3.

The interferometer shown in FIG. 1 is of the Michelson type, consisting basically of a beam splitter 1 and two mirrors 3 and 5 defining the outer ends of the respective fixed and variable length interferometer arms, and arranged to redirect light incident from the beam-splitter back for recombination and interference in the region 4 below the beam splitter as viewed in FIG. 1. The beam splitter is in the form of a cube of transparent material which has been split on a diagonal, covered on the diagonal surface with a partially reflecting coating, then reassembled. The partially reflecting surface is indicated by the dash line 6.

The fixed-arm mirror 3 is integral with the beam splitter cube, and may be a deposited metallic coating for internally reflecting light incident from the surface 6. The variable length arm mirror 5 is also integral with the beam splitter and is arranged to reflect externally incident light. The variable length arm is "folded" by means of a retroreflector 7 such as a cube corner prism or other known means for directing an incident beam of light back on a path exactly parallel to and slightly displaced from that of the incident beam.

A continuous-wave laser 8, for example of the helium-neon type and adapted to produce a collimated beam of substantially monochromatic light, is directed toward the beam splitter 1 and through it toward the retroreflector 7.

A transparent plate 9 having a partially reflecting surface 10 is disposed diagonally between the laser 8 and the beam splitter 1 to divert a part of the light from the laser to a photocell 11 which is used to monitor the laser output and control its operation. The plate 9 also diverts some of the energy that returned toward the laser from the interferometer, introducing sufficient attenuation to prevent undesired fluctuations in the laser output. In a typical case the transmission through plate 9 is about ten percent.

The light emitted by the laser is plane polarized. Plane polarized light can be considered as the vector sum of two plane polarized components in phase with each other, equal in amplitude, and polarized at right angles to each other. The laser is so oriented about its beam axis as to make the plane of polarization of one of these components parallel to the surface 6 of the beam splitter, that is, perpendicular to the plane of the paper in FIG. 1. The other component is then polarized parallel to the plane of the paper.

A retardation plate 12 of birefringent material such as crystalline quartz is disposed in the upper beam path between the beam splitter and retroreflector 7 as shown, and may be mounted directly on the surface of the cube 1 if desired. The optic axis of the crystal is parallel to the plane of polarization of one of the above mentioned components, and perpendicular to that of the other. The refractive index of the crystal for light polarized parallel to its optic axis is slightly different from that for light polarized perpendicularly thereto. Thus one of the components is delayed with respect to the other, by an amount that depends upon the thickness of the plate 12.

The retroreflector 7, if it is in the form of a cube corner prism as illustrated, will also introduce a differential delay between the cross-polarized components. Since the beam of the variable length arm passes twice through the plate 12 and the retroreflector 7, the total differential delay is twice the sum of the individual differential delays. The plate 12 is made of such thickness as to make the total differential delay correspond to a relative phase shift of 90 degrees between the two components.

The interference field formed in region 4 will comprise two components that are cross-polarized and substantially spatially coincident, like the beams in the variable length arm. They are separated by polarization discrimination means such as a Wollaston prism 13, which deflects the differently polarized components to photocells 14 and 15, respectively.

All of the above described elements, except the retroreflector 7, may be fixed on a common support or base member to form a unitary assembly as schematically indicated by the dash line 16 in FIG. 1, and designated the "sensor unit." The sensor unit 16 is the nominally stationary part of the interferometer, and is adapted to be secured to the body or bed, for example of a machine with which measurements are to be made. The retroreflector 7 is arranged to be mounted on a movable slide or other part whose motion is to be measured.

The operation of the system thus far described is basically the same as that of prior art gauging interferometers. As the retroreflector 7 is moved with respect to the sensor unit 16, the intensity of the light striking the photocell 14 varies cyclically. The number of such variations is equal to the number of quarter wavelengths the retroreflector is moved, regardless of the direction of motion and regardless of any reversals in the direction of motion. The light striking the photocell 15 varies similarly, but the variations either precede or follow those at the photocell 14, depending upon whether the distance of the retroreflector from the sensor unit is increasing or decreasing. The amount by which the cyclical variations at one photocell lead or lag those at the other must be other than one half cycle, and will be substantially one quarter cycle with the retardation plate 12 designed as described.

The frequency of the intensity variations will depend on the velocity of motion of the retroreflector, reaching a value of over 160 kilocycles per second when the reflector is moved one inch per second. Even when the retroreflector is nominally stationary, there is generally enough ambient vibration, causing small random variations in the distance, to produce corresponding variations in the light intensities at the photocells. Each of these variations must be counted, in the sense (add or subtract) corresponding to the direction of the respective motion that produced it, in order to avoid erroneous accumulations of counts.

A reversible counter 17 of known type has two input leads 18 and 19 and is provided with a numerical display device 20. Pulses applied to one of input leads, say 18, will be counted in forward, or additive manner. Pulses applied to the other input lead will be counted in backward manner, each such pulse subtracting one unit from the total then standing in the counter. The display 20 may be arranged simply to show the algebraic sum of the pulses counted, in which case the appropriate conversion factor must be used to determine the displacement in conventional units such as inches. Alternatively, and in some cases preferably, the counter 17 is provided with "scaler" means for converting the number of pulses counted to another, smaller number in which each unit corresponds to a displacement of, for example, 0.00001 inch. The number appearing on the display 20 may then be used directly without conversion.

When the retroreflector 7 is moving, the outputs of photocells 14 and 15 will vary cyclically and more or less smoothly between maximum and minimum values, producing respective wave trains that are in phase quadrature, one leading or lagging the other according to the direction of motion. In the Michelson type of interferometer used herein for example, the waves are substantially sinusoidal.

These two wave trains must be converted to a single pulse train, having the same number of pulses as the number of cycles in each wave train, and appearing on one only of leads 18 and 19, depending on which wave train leads the other. One suitable arrangement for this purpose includes the squarer circuits 21 and 22, differentiating circuit 23, diodes 24 and 25, inverter 26, and gate circuits 27 and 28, connected as shown.

The squarer circuits 21 and 22 may be limiters, trigger circuits, or other known means for producing an output at either of two discrete levels; one when the input is below a certain value, and the other when the input is above that value. In a typical operating situation, with the retroreflector 7 moving away from the sensor unit 16, the output of squarer 21 is as shown by the graph A in FIG. 2, and that of squarer 22 is as shown by graph B. Both are square waves, and the former leads the latter by one-quarter cycle.

The differentiator 23 may be a simple R-C circuit that produces a positive going spike when its input goes in the positive direction, and vice versa, as shown at C in FIG. 2. The diodes 24 and 25 conduct the positive going spikes to gate 27 and the negative going spikes to gate 28.

The gates are well known circuits of the type sometimes called "and" gates, designed in this example to conduct a positive going input pulse to an output lead only when a control input lead is made positive.

The inverter 26 is a polarity reversing device such as a single stage unity gain amplifier. The negative going pulses applied to it through diode 25 are reversed to positive going pulses, illustrated at D in FIG. 2.

In the situation represented by graphs A through D of FIG. 2, the positive going pulses of C reach the gate 27 when the output of squarer 22 (waveform B of FIG. 2) is at its lower level. Therefore the gate 27 does not conduct. The negative going pulses of C, now inverted as positive going pulses D, reach gate 28 when B is positive, and are passed on to the forward-counting input lead 18 of the reversible counter 17.

When the retroreflector 7 is moving toward the sensor unit 16, the output of photocell 15 leads that of photocell 14, and the resultant output of squarer 22 is as shown at E in FIG. 2, leading waveform A. Pulses C are positive going when E is positive, and are passed by gate 27 to the backward counting input lead 19 of counter 17.

FIG. 3 illustrates a modified directional sensing system. Only a portion of the beam splitter cube 1 is shown; the remainder of the optical arrangement of the interferometer may be the same as in FIG. 1, except that the retardation plate 12 and Wollaston prism 13 are omitted. The variable length arm mirror 5 is placed on the surface of a piezoelectric crystal 30 instead of directly on the cube face, and the crystal is supported on the cube 1 an shown, using an acoustically absorbent cement. The crystal 30 is of a type that vibrates in thickness, so as to move the mirror 5 toward and away from the adjacent cube face.

The crystal 30 is designed to operate at a frequency of at least 10 times the maximum fringe rate and is arranged to be driven by an oscillator 31 to vibrate at an amplitude such as to move the mirror 5 back and forth through a distance substantially less than that corresponding to one interference fringe. The oscillator 31 is also connected to supply reference phase input to a phase detector 32.

A single photocell 33 is disposed in the path of the interferometer output beam 4, and is connected through a band pass filter 34 to the variable phase input terminal of the phase detector 32. The filter 34 is designed to pass the oscillator frequency and reject all substantially lower and higher frequencies. The photocell 33 is also connected to a low pass filter 35, designed to pass all frequencies from D.C. up to the maximum fringe count frequency and reject the oscillator frequency. A similar low pass filter 36 receives the output of the phase detector 32.

The outputs of filters 35 and 36 are supplied to the squarers 21 and 22 of FIG. 1. The remainder of the signal processing, counting and display or other utilization may be the same as that shown in FIG. 1.

In the operation of the system of FIG. 3, the mirror 5 vibrates at a frequency much higher than the highest expected fringe count frequency. The small high frequency variation in length of the interferometer arm is superimposed upon the much slower variations that result from motion of the retroreflector 7.

FIGURE 4B shows the output of the low pass filter 35 resulting from a uniform motion of the retroreflector. Owing to the high frequency vibratory motion of the mirror (FIG. 4A), an additional much smaller signal is superposed on the output of the photocell. This signal is separated by the band pass filter and is shown in FIG. 4C. It will be noted that the amplitude of the signal 4C in proportional to the slope of the signal 4B, and the phase is either in phase or out of phase with the oscillator output 4A, depending on whether 4B is increasing or decreasing. This phase reversal is detected by the phase detector 32, whose output is shown in FIG. 4D, after removal of the high frequency components by low pass filter 36. Thus the outputs of low pass filters 35 and 36 bear the same phase relationship to one another as do the two photocell outputs in the system of FIG. 1.

Thus the system of FIG. 3 provides directional sensing by cyclically varying the length of the interferometer arm, rather than by providing paths of slightly different propagation delays for differently polarized light components, as in the system of FIG. 1, or non-coincident contiguous paths, as in the prior art.

I claim:

1. In an interferometer of the type that includes a source for producing a beam of a monochromatic light, a retroreflector, means for dividing said beam into first and second parts that are directed along respective paths, one of said paths intersecting said retroreflector, said retroreflector being translatable with respect to said dividing means along the light path therebetween and being oriented with respect to said dividing means to redirect one of said parts from the dividing means for recombination with the other part in an interference field, means for directing said other part to said interference field, whereby the translation of the retroreflector produces cyclic variations in the net intensity of light at a point in said interference field, photoelectric means for producing an electrical signal of a magnitude that corresponds to the light intensity at said point, means responsive to said electrical signal for providing a first interference signal having a cyclic variation corresponding to the cyclic variation in intensity of light at the point in the interference field that results solely from the translation of the retroreflecor, the improvement that comprises, means for cyclically varying the optical length of the path of one of said first and second beam parts to produce a further cyclical variation in said electrical signal in addition to any variation therein resulting from the translation of said retroreflector, the optical length of the path of said one beam part being changed by a distance less than that required to produce one interference fringe in the interference field, and the frequency of the cyclical variation in the optical length of the path of said one beam part being such that the frequency of the further cyclical variation in the electrical signal is higher than the maximum anticipated frequency of the electrical signal that results solely from said translation of the retroreflector, means providing a second interference signal having a cyclic variation corresponding solely to the change in phase of said further cyclical variation in said electrical signal relative to the phase of the cyclical variation in the optical length of said one of the paths, and reversible counting means responsive to said first and second interference signals to produce a count corresponding to the cyclic variations in said first interference signal, the second interference signal controlling the direction of counting of the counting means.

2. The combination claimed in claim 1 wherein the optical length of said one of the paths is varied by means operating in response to an electrical oscillatory signal whose frequency is at least ten times higher than the highest anticipated frequency of the first interference signal, and wherein the means providing the second interference signal includes means responsive to said electrical signal for producing a further electrical signal whose frequency and phase correspond to the frequency and phase of the further cyclical variation in said electrical signal, and means including phase comparison means responsive to said further electrical signal and said oscillatory signal to produce said second interference signal whose frequency and phase are a function of the phase difference between the oscillatory signal and the further electrical signal.

No references cited.

JEWELL H. PEDERSEN, *Primary Examiner.*

B. J. LACOMIS, *Assistant Examiner.*